United States Patent [19]
Tanaka et al.

[11] Patent Number: 5,436,742
[45] Date of Patent: Jul. 25, 1995

[54] METHOD FOR DRIVING A FERROELECTRIC SPATIAL LIGHT MODULATOR INCLUDING A FIRST VOLTAGE, WRITE PULSE, AND SECOND VOLTAGE GREATER THAN AND LONGER THAN THE FIRST

[75] Inventors: Yukio Tanaka, Kadoma; Akio Takimoto, Neyagawa; Hisahito Ogawa, Nara, all of Japan

[73] Assignee: Matsushita Electric Industrial Co., Ltd., Kadoma, Japan

[21] Appl. No.: 45,828

[22] Filed: Apr. 9, 1993

[30] Foreign Application Priority Data

Apr. 17, 1992 [JP] Japan .................. 4-098216

[51] Int. Cl.⁶ ............. G02F 1/1343; G02F 1/135; G09G 3/36
[52] U.S. Cl. ........................ 359/56; 345/95; 345/97; 359/72
[58] Field of Search ............. 359/72, 56; 345/95, 345/97

[56] References Cited

U.S. PATENT DOCUMENTS

| | | | |
|---|---|---|---|
| 4,941,735 | 7/1990 | Moddel et al. | 359/56 |
| 5,073,010 | 12/1991 | Johnson et al. | 359/72 |
| 5,128,663 | 7/1992 | Coulson | 359/56 |
| 5,227,900 | 7/1993 | Inaba et al. | 359/56 |
| 5,260,699 | 11/1993 | Lister et al. | 359/56 |

FOREIGN PATENT DOCUMENTS

| | | |
|---|---|---|
| 0375165 | 6/1990 | European Pat. Off. . |
| 0385346 | 9/1990 | European Pat. Off. . |
| 63-109422 | 5/1988 | Japan . |
| 2191301 | 12/1987 | United Kingdom . |

OTHER PUBLICATIONS

Gomes et al, Japanese Journal of Applied Physics, vol. 30, No. 3A, (Mar. 1991), pp. L386–L388; "Ferroelectric Liquid Crystal Spatial Light Modulator with Gray-Scale Capability".

Takimoto et al, Journal of Photopolymer Science and Technology, vol. 3, No. 1, 1990, pp. 73–81, "A Highly Photoconductive Polyimide Film".

Li et al, IEEE Transactions on Electron Devices, vol. 36, No. 12, (Dec. 1989) pp. 2959–2964, "Hydrogenated Amorphous-Silicon Photosensor for Optically Addressed High-Speed Spatial Light Modulator".

Jared et al, Spatial Light Modulators and Applications III, SPIE, vol. 1150, (Aug. 7–8, 1989), pp. 46–60, "Ferroelectric Liquid Crystal Spatial Light Modulators".

Akiyama et al, Japanese Journal of Applied Physics, vol. 30, No. 12B, (Dec. 1991), pp. 3887–3892, "A New Optical Neuron Device for All-Optical Neural Networks".

*Primary Examiner*—Anita Pellman Gross
*Attorney, Agent, or Firm*—Renner, Otto, Boisselle & Sklar

[57] ABSTRACT

A method for driving a spatial light modulator is disclosed. The spatial light modulator includes a ferroelectric liquid crystal layer, a pair of conductive alignment films sandwiching the ferroelectric liquid crystal layer, a pair of electrodes for applying a voltage to the ferroelectric liquid crystal layer for changing the state of the ferroelectric liquid crystal layer, a photoconductive layer disposed between one of the pair of electrodes and one of the pair of conductive alignment films. The method includes the steps of: (a) applying a reset pulse to the pair of electrodes for resetting the ferroelectric liquid crystal layer to an initial state; (b) applying a first low voltage to the pair of electrodes during a first interval starting from the end of the step (a); (c) applying a writing pulse to the pair of electrodes after the lapse of the first interval while illuminating the photoconductive layer with writing light; (d) applying a second low voltage to the pair of electrodes during a second interval starting from the end of the step (c), the second interval being longer than the first interval; and (e) applying a next reset pulse to the pair of electrodes for resetting the ferroelectric liquid crystal layer to the initial state.

3 Claims, 3 Drawing Sheets

METHOD FOR DRIVING A FERROELECTRIC SPATIAL LIGHT MODULATOR INCLUDING A FIRST VOLTAGE, WRITE PULSE, AND SECOND VOLTAGE GREATER THAN AND LONGER THAN THE FIRST

BACKGROUND OF THE INVENTION

1. Field of the Invention

The present invention relates to a method for driving a spatial light modulator, and more specifically, to a method for driving a spatial light modulator using an alignment film with high conductivity.

2. Description of the Related Art

In the field of high definition TV having pixels arranged at a high density for displaying an image on a large image plane, various constructions have been proposed and put into practical use. Projection display apparatuses using a liquid crystal display device instead of a conventional cathode ray tube (hereinafter, referred to as CRT) have actively been developed.

In a display apparatus using a CRT, a higher density of pixels results in a lower luminance of an image plane to darken an image. Moreover, it is difficult to enlarge the size of the CRT itself. In contrast, a projection display apparatus using a liquid crystal display device operated by transistors has problems in that it is difficult to enhance the numerical aperture, i.e., the ratio of the total area of pixels with respect to the area of display, as well as the fact that a liquid crystal display device is expensive.

A liquid crystal light valve using a CRT for optical input is the focus of attention for a simple construction and for having advantages of both of the CRT and the liquid crystal display device. An example of such a device is disclosed in Japanese Laid-Open Patent Publication No. 63-109422. Today, the use of a light valve including a highly sensitive light receiving layer (namely, photoconductive layer) formed of amorphous silicon and a liquid crystal material allows a moving image to be produced on a large image plane having a size of 100 inches or larger. The use of a ferroelectric liquid crystal (hereinafter, referred to as the FLC) having a high response speed as a liquid crystal material realizes a liquid crystal light valve with a faster response and a higher resolution. Such a light valve utilizing the FLC for an excellent memory function and a high bistability thereof is considered to have a critical role in optical computing, which is a future technology for parallel operation.

A spatial light modulator (hereinafter, referred to as the SLM) including an FLC layer and a photoconductive layer is driven at a driving pulse shown in FIG. 7, which includes a reset pulse 201, a first low-voltage interval 202, a writing pulse 203, and a second low-voltage interval 204. This driving method is described, for example, in Jpn. J. Appl. Phys. 30, 3A (1991), pp. L386-L388.

According to this driving method, first, the reset pulse 201 is applied to an SLM to reset data written in an FLC layer and thus to darken the FLC, for example. That is, when the reset pulse 201 is applied, molecules of the FLC are aligned in a specified direction which prevents the FLC layer from reflecting reading light to output it from the SLM. This state (light-off state) is maintained through the first low-voltage interval 202 due to the memory function of the FLC. Then, the writing pulse 203 is applied to the SLM. At this time, when the SLM receives writing light with sufficiently high intensity, the resistance of a photoconductive layer is lowered at portions thereof exposed to the writing light. This results in the alignment of the FLC molecules being inversely changed at the corresponding portions thereof by the application of the writing pulse 203. Thus, these inversely-aligned portions of the FLC are lightened. This state (light-on state) is maintained through the second low-voltage interval 204 due to the memory function of the FLC, until the next reset pulse 201 is applied. The average intensity of the reading light for a specified time period including the repeated light-on and light-off states is recognized as the brightness of the displayed image by a viewer. In the conventional driving method, the first and the second low-voltage intervals 202 and 204 are set to be equal.

When the above SLM is used for a projection display apparatus, providing a high contrast is essential.

According to the above driving method, however, the waveform of the driving pulse needs to be symmetrical with regard to the writing pulse 203 so as to ensure that no change in the alignment of the FLC molecules with time be caused due to overcharging at an alignment film. This is the reason why the first and the second low-voltage intervals 202 and 204 are set to be equal. By this setting, the first low-voltage interval 202 occupies a large portion (approximately half) of the period of the driving pulse. This results in the effective brightness of the reading light being decreased and thus lowering the contrast.

SUMMARY OF THE INVENTION

The present invention provides a method for driving a spatial light modulator including a ferroelectric liquid crystal layer, a pair of conductive alignment films sandwiching the ferroelectric liquid crystal layer, a pair of electrodes for applying a voltage to the ferroelectric liquid crystal layer for changing the state of the ferroelectric liquid crystal layer, a photoconductive layer disposed between one of the pair of electrodes and one of the pair of conductive alignment films. The method includes the steps of: (a) applying a reset pulse to the pair of electrodes for resetting the ferroelectric liquid crystal layer to an initial state; (b) applying a first low voltage to the pair of electrodes during a first interval starting from the end of the step (a); (c) applying a writing pulse to the pair of electrodes after the lapse of the first interval while illuminating the photoconductive layer with writing light; (d) applying a second low voltage to the pair of electrodes during a second interval starting from the end of the step (c), the second interval being longer than the first interval; and (e) applying a next reset pulse to the pair of electrodes for resetting the ferroelectric liquid crystal layer to the initial state.

Thus, the invention described herein makes possible the advantage of providing a method for driving a spatial light modulator capable of enhancing the intensity of reading light thus obtaining an image with high contrast on a display plane.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of an illustrating example with reference to the accompanying drawings.

Figure 3:
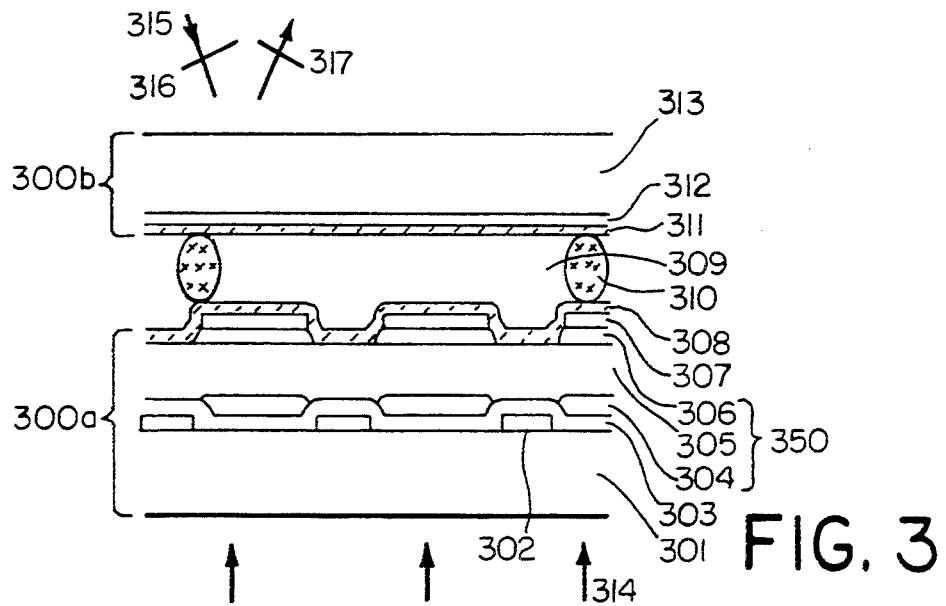
FIG. 3 is a sectional view showing a spatial light modulator to which the method according to the present invention is applied.

FIG. 3 schematically shows a cross section of a preferred example of a spatial light modulator (SLM) used for the driving method according to the present invention. The SLM includes a first panel 300a, a second panel 300b, and a ferroelectric liquid crystal (FLC) layer 309 interposed therebetween. The FLC layer 309 can be in at least two states depending on the voltage to be applied thereto.

Writing light 314, which is incident on the first panel 300a from below, is used for writing an optical image into the FLC layer 309. Reading light 315 is used for reading the optical image written in the FLC layer 309. The reading light 315 is emitted toward the second panel 300b from above and linearly polarized by a polarizer 316 before being incident on the second panel 300b. Then, the reading light 315 is transmitted through the FLC layer 309, reflected by reflecting films 307, and transmitted again through the FLC layer 309 so as to be out of the SLM. Thereafter, the reading light 315 is transmitted through an analyzer 317 to be output light. Image data written in the FLC layer 309, namely, the optical image is read out based on an intensity distribution of the output light.

The first and the second panels 300a and 300b will be described in detail. The first panel 300a includes a transparent insulating substrate 301, a light blocking film 302 provided on the transparent insulating substrate 301, a transparent conductive electrode (first electrode) 303 provided on the transparent insulating substrate 301 so as to cover the light blocking film 302, a photoconductive layer 350 provided on the transparent conductive electrode 303, a plurality of the reflecting films 307 provided on the photoconductive layer 350, and an alignment film 308 provided on the photoconductive layer 350 so as to cover the reflecting films 307.

The light blocking film 302 has a plurality of apertures, and the apertures correspond to pixels, respectively. The writing light 314 transmitted through the transparent insulating substrate 301 passes through the apertures of the light blocking film 302 to be incident on the photoconductive layer 350. The writing light 314 incident on the photoconductive layer 350 through the apertures generates electrical carriers (electrons and holes) at portions of the photoconductive layer 350 corresponding to the apertures. Such portions of the photoconductive layer 350 will be referred to as the pixel portions, hereinafter. The amount of the electrical carriers depends on the intensity of the writing light 314.

The photoconductive layer 350 includes an i-layer 305 having two main surfaces which are substantially parallel to each other, a plurality of p-layers 304 provided on one of the main surfaces of the i-layer 305, and a plurality of n-layers 306 provided on the other main surface of the i-layer 305. The n-layers 306 are opposed to the p-layers 304, respectively, through the i-layer 305. As described above and as shown in FIG. 3, each of the pixel portions of the photoconductive layer 350 has a three-layer structure including the p-layer 304, the i-layer 305, and the n-layer 306. In contrast, an inter-pixel portion between the pixel portions (hereinafter, referred to simply as the inter-pixel portion) has a single layer structure of the i-layer 305. According to this SLM, in each pixel portion, the layers having a low resistance, namely, the p-layer 304 and the n-layer 306 are electrically isolated from each other by a layer having a high resistance, namely, the i-layer 305.

Instead of silicon (Si), the photoconductive layer 350 can be formed of a compound semiconductor such as CdS, CdTe, CdSe, ZnS, ZnSe, GaAs, GaN, GaP, GaAlAs, or InP, an amorphous semiconductor such as Se, SeTe, or AsSe, or a polycrystalline or amorphous semiconductor such as Ge, $Si_{1-x}C_x$, $Si_{1-x}Ge_x$, or $Ge_{1-x}C_x$ ($0<x<1$). Further examples which can be used for the photoconductive layer 350 include the following organic semiconductors:

(1) Phthalocyanine pigments (hereinafter, referred to as Pc) such as nonmetallic Pc, XPc (X=Cu, Ni, Co, TiO, Mg, Si(OH), etc.), AlClPc, TiOClPcCl, InClPcCl, InClPc, InBrPcBr, etc.;

(2) Azo coloring matters such as mono azo and dis azo coloring matters;

(3) Perylene pigments such as perylenic acid anhydride and perylenic imide;

(4) Indigoid dyes;

(5) C. I. Pigment Violet 1;

(6) Polycyclic quinones such as anthraquinone and pyrenequinone;

(7) Cyanine coloring matters;

(8) Xanthene dyes;

(9) Charge-transfer complexes such as PVK/TNF;

(10) Eutectic complex formed of a pyrylium salt dye and polycarbonate resin; and

(11) Azulenium salt compound.

In the case when the amorphous semiconductor such as Si, Ge, $Si_{1-x}C_x$, $Si_{1-x}Ge_x$, or $Ge_{1-x}C_x$ is used for the photoconductive layer 350, hydrogen or halogen may be contained in the amorphous semiconductor. Oxygen or nitrogen may be contained in the amorphous semiconductor in order to lower the dielectric constant and increase the resistance of the photoconductive layer 350. In order to control the resistance, the amorphous semiconductor may be doped with B, Al, Ga, or other p-type impurities or with P, As, Sb or other n-type impurities.

The reflecting films 307 are provided on and electrically connected to the n-layers 306, respectively. The reflective films 307 are electrically isolated from one another, and can have different potentials from one another. As will be described later, the difference between the potential of each reflecting film 307 and the potential of a transparent conductive electrode 312 is changed in accordance with the potential of each reflecting film 307. Therefore, the potential of each reflecting film 307 influences the optical properties of a pixel portion of the FLC layer 309 corresponding to the reflecting film 307. Since the reflecting films 307 reflect the reading light 315 and thus define the corresponding pixel, the reflecting films 307 are also referred to as pixel electrodes. The reflecting films 307 also act as blocking films for preventing the reading light 315 from being incident on the pixel portions of the photoconductive layer 350. The reflecting films 307 are preferably formed of a material which is both electrically conductive and optically reflective, for example, a thin metal film of aluminum, chrome, titanium or the like.

The second panel 300b includes a transparent insulating substrate 313, the transparent conductive electrode (second electrode) 312 provided on the transparent insulating substrate 313, and an alignment film 311 provided on the transparent conductive electrode 312.

The alignment films 308 and 311 are provided in order to align molecules of the FLC to be parallel to the layers and films of the SLM. The alignment films 308 and 311 have high conductivity, and preferably have a thickness in the range of 1 to 100 nm (10 to 1000 Å). The alignment films 308 and 311 are preferably formed of a conductive polymer such as nylon, polyimide, or others having a structure represented by a formula:

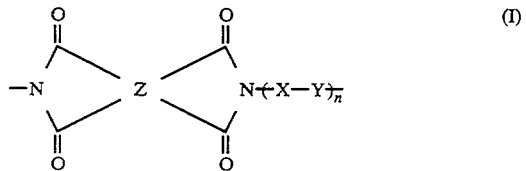

(I)

wherein $n \geq 2$, X is O, S, Se, or Te, Y is an aromatic group or an aromatic group containing a substituent, and Z is a group containing an aromatic group.

By using the alignment films 308 and 311 with high conductivity, electrical carriers generated in the FLC layer 309 flow through the alignment films 308 and 311 to the first and the second electrodes 303 and 312. This prevents the alignment films 308 and 311 from being overcharged, and thereby prevents the alignment of the FLC molecules from changing with time due to overcharging at the alignment films 308 and 311. The alignment films 308 may be charged due to the asymmetry of the pulse itself or the asymmetry caused by the rectifying function of the photoconductive layer 350. Such a change, however, can be compensated by adjusting voltages to be applied during first and second intervals to be described later.

The first and the second panels 300a and 300b, more accurately, the alignment films 308 and 311 have spacers 310 therebetween. A diameter of the spacers 310 determines the distance between the first and the second panels 300a and 300b, namely, a cell thickness. Although ferroelectric chiral smectic C liquid crystal is used as the liquid crystal material for this SLM, other liquid crystal materials can also be used. Preferably, the thickness of the FLC layer 309 is approximately 1 μm for the SLM of the reflective type. With this thickness, output light from the SLM can provide a high contrast.

Next, a method for producing the SLM shown in FIG. 3 will be described.

As the transparent insulating substrate 301, a glass substrate having a size of 55 mm (length)×45 mm (width)×1.1 mm (thickness) is used. First, a chrome film (thickness: 100 nm) is formed on the entire surface of the transparent insulating substrate 301 by vacuum evaporation. Hereinafter, the transparent insulating substrate 301 having one or more layers and films formed thereon will be referred to as the "substrate" for simplicity. A plurality of apertures are formed in the chrome film by photolithography in order to obtain the light blocking film 302. The apertures each have a size of 40 μm×40 μm and are two-dimensionally arranged at a pitch of 45 μm. The apertures correspond to the pixels, respectively. Then, the first electrode 303 is formed so as to cover the light blocking film 302.

Thereafter, as the photoconductive layer 350, an amorphous silicon layer having a pin diode structure with a thickness of 2.2 μm is formed by plasma CVD on the first electrode 303 over an effective area of 35 mm×35 mm thereof in the following manner. First, a p-type film (thickness: 50 nm) containing boron in an amount of 1000 ppm diffused in the effective area is formed. The resultant substrate is taken out from a plasma CVD apparatus, and a resist pattern regulating the pixel pattern is formed on the p-type film by photolithography. The p-type film is etched using the resist pattern as a mask so as to form the p-layers 304 on positions above the respective apertures of the light blocking film 302.

After the resist pattern is removed, the resultant substrate is again inserted into the plasma CVD apparatus to sequentially form the i-layer 305 (thickness: 2 μm) with no impurities and an n-type film (thickness: 200 nm) doped with phosphorus as an impurity on the resultant substrate. Then, an aluminum thin film (thickness: 150 nm) is formed on the n-type film by electron beam evaporation, and a resist pattern is formed on areas of the aluminum thin film corresponding to the pixels by photolithography.

The aluminum thin film is patterned by wet etching using an acid liquid. The n-type film is patterned by wet etching using a solution including hydrogen fluoride or reactive ion etching (RIE) using $CF_4$ and oxygen. Thus, the n-layers 306 and the reflecting films 307 are formed so as to cover areas of the i-layer 305 corresponding to the p-layers 304.

Thereafter, as the alignment film 308, a film made of polyimide having a structure of formula I is formed so as to cover the n-layers 306, the reflecting films 307, and exposed portions of the i-layer 305 (the inter-pixel portions) in the following manner. First, the substrate is coated with polyamic acid, which is a precursor of polyimide, by use of a spinner so as to have a thickness of 20 nm or less. Then, the substrate coated with polyamic acid is heated at 230° C. for an hour in an oven in order to imidize polyamic acid into a polyimide film.

Concerning the second panel 300b, the second electrode 312 made of ITO is formed by sputtering on the transparent insulating substrate 313 formed of glass, and then the alignment film 311 is formed on the second electrode 312 in the same manner as for the first panel 300a. The alignment films 308 and 311 are rubbed in an identical direction by a nylon cloth.

The FLC layer 309 is formed in the following manner. First, the spacers 310 each formed of a bead having a diameter of 1 μm dispersed in isopropylalcohol are sprayed toward the surface of the alignment film 311 of the second panel 300b. Peripheries of the first and the second panels 300a and 300b are coated with a UV-curing resin, thereby adhering the first and the second panels 300a and 300b to each other. The UV-curing resin is cured by UV radiation, thereby forming a cell. Under vacuum, the FLC is injected into the cell. As to the FLC, ZLI-3654 produced by Merck & Co., Inc. or the like is used. After the injection, in order to uniformly align the FLC molecules, the temperature of the FLC is raised to a phase transition temperature of the FLC (62° C. in the case of ZLI-3654) or higher, and then gradually lowered to room temperature at a speed of 1° C./min. or less. By such a treatment, the FLC molecules can be realigned in a specified orientation.

Figure 1:
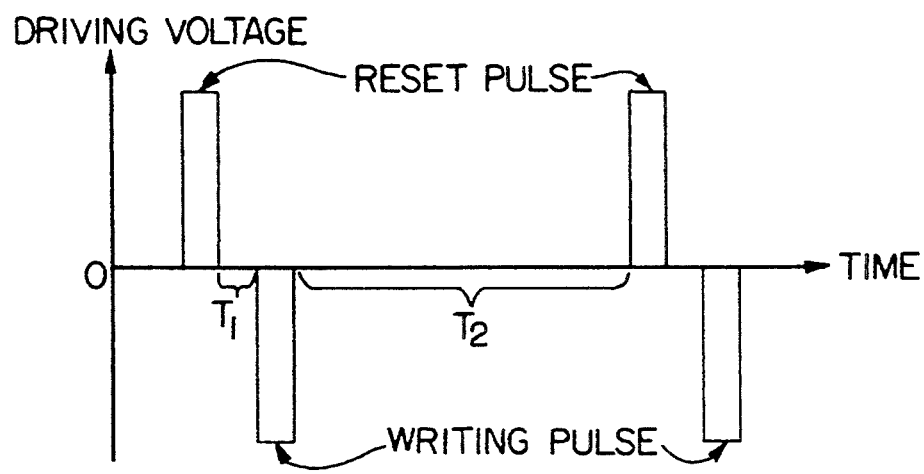
FIG. 1 shows a driving pulse waveform used for the method for driving a spatial light modulator according to the present invention.

Next, the method for driving the SLM will be described with reference to FIGS. 1 and 3.

The first and the second electrodes 303 and 312 of the SLM are applied with a reset pulse for resetting the alignment of molecules of the FLC layer 309 to an initial state. In the SLM shown in FIG. 3, each pixel portion of the photoconductive layer 350 has a pin structure including the p-layer 304, the i-layer 305, and the n-layer 306 acting as a rectifier. The applied reset pulse forward-biases the pin structure. Namely, the reset pulse is applied to the first and the second electrode 303 and 312 so that the potential of the first electrode 303 is higher than that of the second electrode 312. By this application of the forward voltage, current flows from the first electrode 303 to all the reflecting films 307 through the pin structures of the photoconductive layer 350. This results in that the FLC layer 309 is forcibly realigned to the initial state regardless of the illumination of the writing light 314.

The voltage of the reset pulse is preferably in the range of 10 to 15 volts when the pulse width is approximately 100 μsec. The pulse width of the reset pulse, as well as that of the writing pulse described later, is typically in the range of 1 μsec. to 10 msec. The voltage of the reset pulse therefore should be appropriately determined depending on an actual pulse width.

After the application of the reset pulse, the first and the second electrodes 303 and 312 are applied with a first low voltage during a first interval T1, for example, an interval in the range of 1 μsec. to 100 msec. The first low voltage is not necessarily zero as shown in FIG. 1.

After the lapse of the first interval T1, the first and the second electrodes 303 and 312 are applied with the writing pulse. The writing pulse inversely biases the pin structure of the photoconductive layer 350. When the SLM is illuminated with the writing light 314 at the time of the application of the writing pulse, electrical carriers (electrons and holes) are generated in portions of the photoconductive layer 350 receiving the writing light 314. The electrons are drifted to the n-layers 306, and the holes are drifted to the p-layers 304. As a result, a photocurrent flows between the first and the second electrodes 303 and 312, thereby changing the potentials of the corresponding reflecting films 307.

As described above, when the inverse writing pulse is applied to the photoconductive layer 350, the pixel portions receiving the writing light 314 are put into a low resistance state, thereby inverting the alignment of the FLC molecules in the corresponding portions of the FLC layer 309. Since the pixel portions receiving no writing light 314 are kept in a high resistance state, alignment of the FLC molecules in the corresponding portions of the FLC layer 309 is not inverted. Such inversion and non-inversion of the FLC molecules forms an alignment pattern in the FLC layer 309.

Thus, the FLC layer 309 stores a two-dimensional optical image carried by the writing light 314 at the time of the application of the writing pulse. The voltage of the writing pulse is 50 to 80% of that of the reset pulse. If the writing voltage is excessively large, this causes molecules in portions of the FLC layer 309 corresponding to pixel portions receiving no writing light 314 to be inversely aligned by a small amount. This undesirable inversion of the alignment lowers the contrast ratio of the reading light 315 (the ratio of the intensity of the reading light 315 reflected from portions receiving the writing light 314 with respect to that reflected from portions receiving no writing light 314). This trouble can be prevented by setting the voltage of the writing pulse to 50 to 80% of that of the reset pulse. If the alignment films 308 and 311 are not electrically conductive, it is not possible to lower the voltage of the writing pulse below that of the reset pulse.

After the application of the writing pulse, the first and the second electrodes 303 and 312 are applied with a second low voltage during a second interval T2 (T2>T1), for example, an interval in the range of 1 μsec. to 100 msec. During the second interval T2, the optical image written into the FLC layer 309 at the application of the writing pulse is maintained therein. After the lapse of the second interval T2, the first and the second electrodes 303 and 312 are applied with the next reset pulse. This causes the FLC layer 309 to be forcibly reset to the initial state regardless of the state maintained in the FLC layer 309 at that time.

Figure 2A:
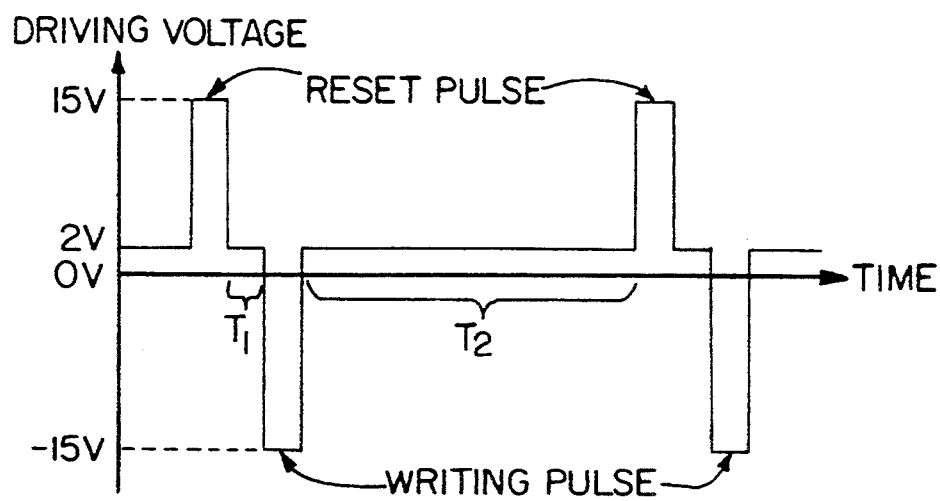
FIGS. 2A, 2B, and 2C show variations of driving pulse waveforms used for the method for driving a spatial light modulator according to the present invention.
Figure 2B:
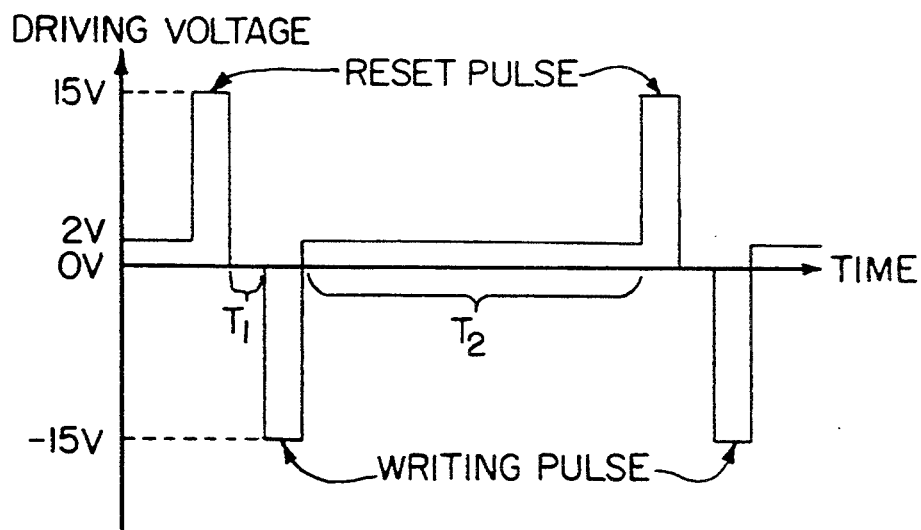
Figure 2C:
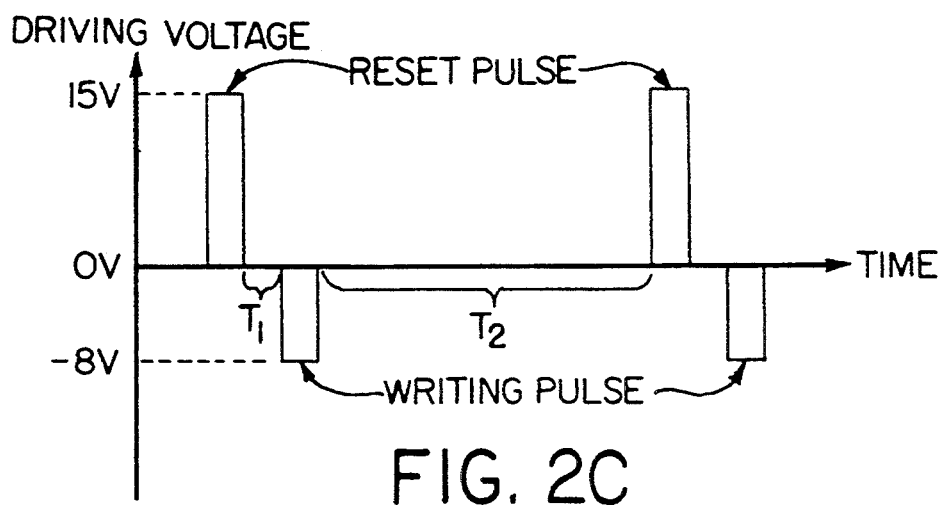

According to the method of the present invention, the second interval T2 is set longer than the first interval T1. The duty ratio of the driving pulse (the ratio of the sum of the application times of the reset pulse and the writing pulse with regard to the period of the driving pulse) is typically 1/10 to 1/10000. The values of the first and the second low voltages are not necessarily identical to each other and preferably set in the range of −5 to 5 volts. FIGS. 2A to 2C show another exemplary waveforms of the driving pulse used for the method of the present invention.

The relationship between the intensity of the reading light 315 and the intervals in the pulse cycle is represented by following equations (1) and (2). In these equations, I is the average intensity of the reading light 315 reflected from the portion of the FLC layer 309 corresponding to the pixel portion receiving the writing light 314 for a one cycle period, and $I_0$ is the intensity of the reading light 315 reflected from the portion of the FLC layer 309 in which the alignment of the FLC molecules has been completely inverted upon receipt of the writing light 314.

$$MI_0 T2 = I(T1+T2) \qquad (1)$$

$$(I/I_0) = Mr/(r+1) = M/(1+1/r) \qquad (2)$$

wherein r is a ratio of the second interval T2 to the first interval T1 (T2/T1) and M is a memory rate of the FLC layer 309. The memory rate refers to an average of memory capability of the FLC layer as measured for a specified time period.

Equation (2) is a modification of equation (1). From equation (2), $I/I_0$ increases with the increase of r. Since $r=1$ for the conventional driving method, $I/I_0=M/2$. According to the driving method of the present invention, the value of $I/I_0$ can be twice the value in the conventional case at the most. For example, when $r=100$, $I/I_0$ is $M/1.01$. As will be described later, when the second interval T2 is set to be longer to such an extent that r exceeds 1000, it exceeds a duration during which the FLC layer 309 can maintain written data (for example, 0.5 sec.). This causes decrease in the memory rate M, thereby lowering the contrast ratio. The relationship among the ratio r (T2/T1), the memory rate M, and the contrast ratio is shown in Table 1.

TABLE 1

| r | memory rate | contrast ratio |
| --- | --- | --- |
| 1 | 1.0 | 100 |
| 10 | 1.0 | 180 |
| 100 | 1.0 | 200 |
| 1000 | 0.5 | 100 |
| 5000 | x | 10 |

As can be seen from Table 1, when r is greater than 1 and less than 1000, the contrast ratio is enhanced. When r exceeds 1000, the memory rate decreases and thus the contrast ratio lowers. As a result, r is preferably in the range of 1 to 1000.

The driving method of the present invention is also applicable to an SLM other than the SLM described above with reference to FIG. 3. One example of such an SLM is shown in FIG. 4.

Figure 4:
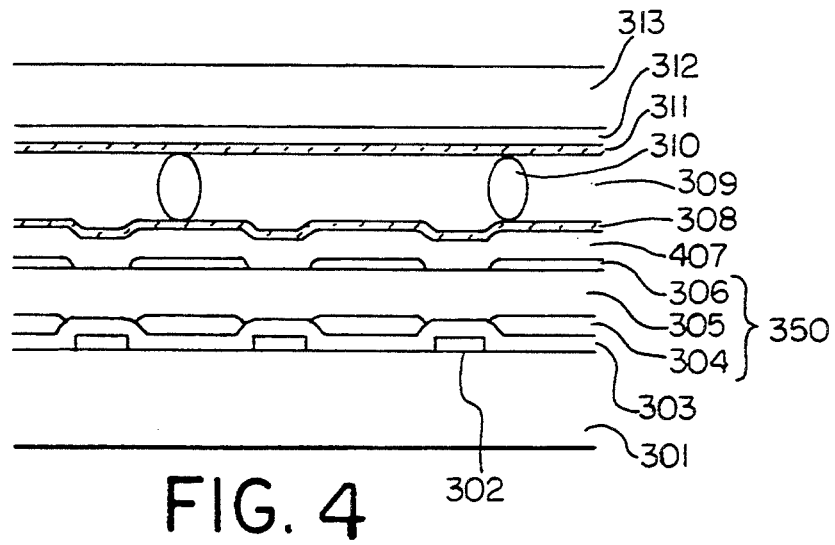
FIG. 4 is a sectional view showing another spatial light modulator to which the method according to the present invention is applied.

The SLM in FIG. 4 has the same structure as that in FIG. 3, except that the reflecting films 307 are replaced with a dielectric reflecting film 407 which covers the entire top surface of the photoconductive layer 350. The method for driving this SLM is the same as that described with reference to the SLM of FIG. 3.

In the above examples, the polymer having a structure represented by formula I was used for the conductive alignment films. However, an alignment film made of other conductive material which is effective in preventing an overcharge can be used. Also, the photoconductive layer is not necessarily provided with the rectifying function as shown in the above examples.

Figure 5:
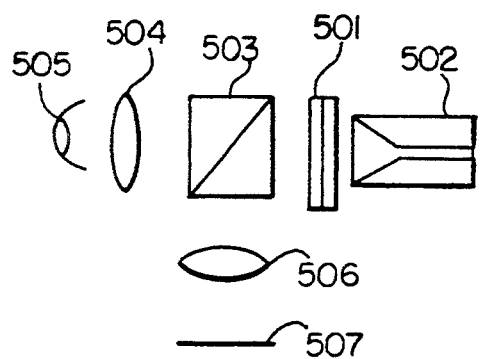
FIG. 5 is a schematic view illustrating a projection display apparatus utilizing the method according to the present invention.

FIG. 5 schematically shows a projection display apparatus using the SLM produced in the above-mentioned manner. Such a projection display apparatus with the SLM was evaluated for performance by applying a driving pulse having the waveform shown in FIG. 1.

In the projection display apparatus, a CRT display 502 provides writing light to an SLM 501 for optical writing in the SLM 501. The SLM 501 has total 480 (vertically)×650 (laterally) pixels. Reading light emitted from a metal halide light source 505 is collimated by a condenser lens 504, transmitted through a polarizing beam splitter 503, and incident on the SLM 501. The reading light reflected from the SLM 501 bearing modulated output images is then incident on the polarizing beam splitter 503, and reflected by 90° toward a lens 506. The reflected reading light is diverged by the lens 506 so as to reproduce magnified images on a screen 507.

When pixels of an image plane of the CRT display 502 are written in the pixels of the SLM 501 isolated from one another and read out, the pixels on the screen 507 are rectangular. This results in bright images on the screen 507 having a numerical aperture of substantially 80%. This means that an image magnified to a size corresponding to 100 inches has a light flux of 2000 lm (lumens) on the screen 507. In the projection display apparatus in FIG. 5, the image on the screen 507 has a contrast ratio of 250:1 and a resolution of 650 lateral TV lines. In the case when a moving image was projected, no after image was generated with respect to the video rate, and a clear image having a high luminance was obtained. In order to obtain a color image, three sets of the CRT displays 502 and the SLMs 501 were prepared for the RGB colors. A color image was obtained by synthesizing three images corresponding to the RGB colors on the screen 507.

Figure 7:
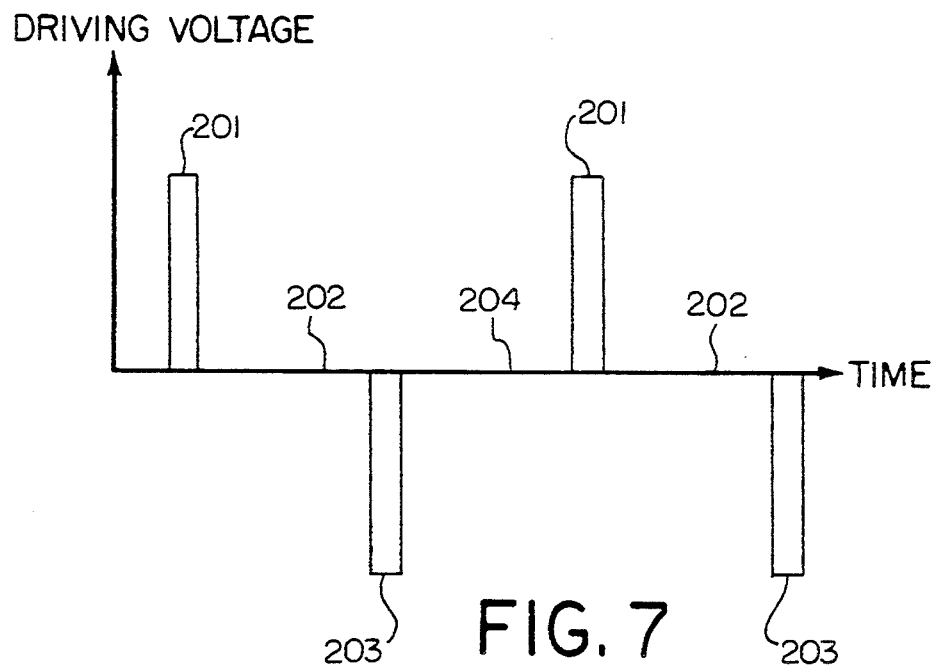
FIG. 7 shows a driving pulse waveform used for a conventional method for driving a spatial light modulator.

As a comparative example, the SLM 501 in the projection display apparatus of FIG. 5 was driven at the conventional pulse cycle shown in FIG. 7, and an output image on the screen 507 was evaluated. As a result, the contrast ratio of 120:1 was obtained.

Figure 6:
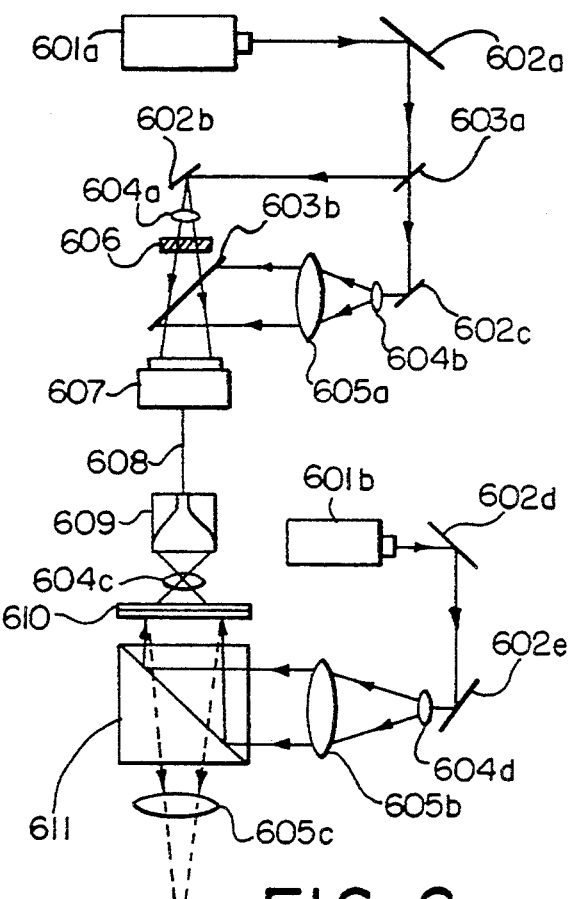
FIG. 6 is a schematic view illustrating a holography television apparatus utilizing the method according to the present invention.

A holography television apparatus as schematically shown in FIG. 6 was assembled using the SLM produced in the manner described above in order to evaluate a reproduced three-dimensional image in real time. Referring to FIG. 6, coherent light from a He-Ne laser 601a is reflected by a mirror 602a and divided into two light fluxes by a half mirror 603a. One of the light fluxes is reflected by a mirror 602b and transmitted through a lens 604a to illuminate an object 606 to be displayed and incident on a CCD 607. The other light flux is reflected by a mirror 602c, transmitted through a lens 604b and a collimator lens 605a, and incident on the CCD 607 as reference light through a half mirror 603b. As a result, an interference fringe pattern is produced on an image plane of the CCD 607. An image of the interference fringe pattern is converted into an electric signal and transferred to a CRT 609 for reproduction. An image data reproduced on an image plane of the CRT 609 is written into an SLM 610 through a lens 604c. In the SLM 610 used in this holography television apparatus, pixels having a size of 8 μm×8 μm are arranged at a pitch of 10 μm and at 100 lp/mm (total $3200 \times 3200 = 10^7$ pixels).

The optical image written into the SLM 610 is read out in the following manner. Coherent light emitted from a He-Ne laser 601b is reflected by a mirror 602d and a mirror 602e, transmitted through a lens 604d and a collimator lens 605b, and incident on the SLM 610 through a polarizing beam splitter 611. Then, the light modulated in the SLM 610 is reflected as output light, which is transmitted through the polarizing beam splitter 611 and a lens 605c to be observed as a three-dimensional image.

From the results of the above evaluation tests, it is found that the present invention provides a method for driving the SLM suitable for a projection display apparatus, and that a holography television apparatus using the SLM driven according to the present invention provides a clear three-dimensional image in real time.

The application of the method for driving the SLM of the present invention is not limited to the projection display apparatus and the holography television apparatus as described above, but the method is also applicable to other apparatuses using the SLM, such as an optical computing apparatus.

The method of the present invention is applicable to a spatial light modulator including a ferroelectric liquid crystal layer, a pair of conductive alignment films sandwiching the FLC layer, a pair of electrodes for applying a voltage to the FLC layer for changing the state of the FLC layer, a photoconductive layer disposed between one of the electrodes and one of the conductive alignment films.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for driving a spatial light modulator including a ferroelectric liquid crystal layer, a pair of conductive alignment films sandwiching said ferroelectric liquid crystal layer, a pair of electrodes for applying a voltage to said ferroelectric liquid crystal layer for changing the state of said ferroelectric liquid crystal layer, a photoconductive layer disposed between one of said pair of electrodes and one of said pair of conductive alignment films, said method comprising the steps of:
   (a) applying a reset pulse to said pair of electrodes for resetting said ferroelectric liquid crystal layer to an initial state;
   (b) applying a first low voltage to said pair of electrodes during a first interval starting from the end of said step (a);
   (c) applying a writing pulse to said pair of electrodes after the lapse of said first interval while illuminating said photoconductive layer with writing light;
   (d) applying a second low voltage to said pair of electrodes during a second interval starting from the end of said step (c), said second interval being longer than said first interval and the absolute value of said second low voltage being larger than that of said first low voltage; and
   (e) applying a next reset pulse to said pair of electrodes for resetting said ferroelectric liquid crystal layer to said initial state.

2. A method according to claim 1, wherein the absolute value of the voltage of said writing pulse is in the range of 50 to 80% of that of the voltage of said reset pulse.

3. A method for driving a spatial light modulator including a ferroelectric liquid crystal layer, a pair of conductive alignment films sandwiching said ferroelectric liquid crystal layer, a pair of electrodes for applying a voltage to said ferroelectric liquid crystal layer for changing the state of said ferroelectric liquid crystal layer, a photoconductive layer disposed between one of said pair of electrodes and one of said pair of conductive alignment films, said method comprising the steps of:
   (a) applying a reset pulse to said pair of electrodes for resetting said ferroelectric liquid crystal layer to an initial state;
   (b) applying a first low voltage to said pair of electrodes during a first interval starting from the end of said step (a);
   (c) applying a writing pulse to said pair of electrodes after the lapse of said first interval while illuminating said photoconductive layer with writing light;
   (d) applying a second low voltage to said pair of electrodes during a second interval starting from the end of said step (c), said second interval being longer than said first interval; and
   (e) applying a next reset pulse to said pair of electrodes for resetting said ferroelectric liquid crystal layer to said initial state, wherein the ratio of said second interval to said first interval is greater than 1 and smaller than 1000, and the absolute value of said second low voltage is larger than that of said first low voltage.

* * * * *